United States Patent
Li et al.

(10) Patent No.: US 9,235,766 B2
(45) Date of Patent: Jan. 12, 2016

(54) OPTIMIZING THE DETECTION OF OBJECTS IN IMAGES

(75) Inventors: Ying Li, Mohegan Lake, NY (US); Sharathchandra Pankanti, Darien, CT (US)

(73) Assignee: International Business Machines Corporation, Armonk, NY (US)

(*) Notice: Subject to any disclaimer, the term of this patent is extended or adjusted under 35 U.S.C. 154(b) by 1118 days.

(21) Appl. No.: 13/277,936

(22) Filed: Oct. 20, 2011

(65) Prior Publication Data

US 2013/0101157 A1    Apr. 25, 2013

(51) Int. Cl.
*G06K 9/00* (2006.01)

(52) U.S. Cl.
CPC ........ *G06K 9/00805* (2013.01); *G06K 9/00818* (2013.01); *B60W 2550/10* (2013.01); *B60W 2550/402* (2013.01)

(58) Field of Classification Search
USPC .......................................... 382/103; 340/905
See application file for complete search history.

(56) References Cited

U.S. PATENT DOCUMENTS

| | | | |
|---|---|---|---|
| 6,850,837 | B2 | 2/2005 | Paulauskas et al. |
| 7,406,482 | B2 | 7/2008 | Dorum et al. |
| 7,408,137 | B2 | 8/2008 | Sawachi |
| 7,433,889 | B1 | 10/2008 | Barton |
| 7,460,953 | B2 | 12/2008 | Herbst et al. |
| 7,477,295 | B2 | 1/2009 | Tanaka |
| 7,499,949 | B2 | 3/2009 | Barton |
| 7,688,229 | B2 | 3/2010 | Sula et al. |
| 8,212,812 | B2 * | 7/2012 | Tsin et al. ...................... 345/420 |
| 2005/0154505 | A1 | 7/2005 | Nakamura et al. |
| 2006/0228000 | A1 * | 10/2006 | Miyajima et al. ............. 382/104 |

(Continued)

FOREIGN PATENT DOCUMENTS

| | | |
|---|---|---|
| DE | 102008024707 | 11/2009 |
| EP | 2154542 | 2/2010 |

(Continued)

OTHER PUBLICATIONS

Gandhi, T., et al., "Vehicle Surround Capture: Survey of Techniques and a Novel Omni-Video-Based Approach for Dynamic Panoramic Surround Maps," IEEE Transactions on Intelligent Transportation Systems, vol. 7, No. 3, Sep. 2006.

(Continued)

*Primary Examiner* — Vikkram Bali
(74) *Attorney, Agent, or Firm* — Fleit Gibbons Gutman Bongini & Bianco PL; Jose Gutman

(57) ABSTRACT

A system and method detect objects in a digital image. At least positional data associated with a vehicle is received. Geographical information associated with the positional data is received. A probability of detecting a target object within a corresponding geographic area associated with the vehicle is determined based on the geographical data. The probability is compared to a given threshold. An object detection process is at least one of activated and maintained in an activated state in response to an object detection process in response to the probability being one of above and equal to the given threshold. The object detection process detects target objects within at least one image representing at least one frame of a video sequence of an external environment. The object detection process is at least one of deactivated and maintained in a deactivated state in response to the probability being below the given threshold.

15 Claims, 5 Drawing Sheets

(56) References Cited

U.S. PATENT DOCUMENTS

| | | |
|---|---|---|
| 2008/0312824 A1 | 12/2008 | Jung |
| 2009/0027185 A1* | 1/2009 | Daura Luna et al. ......... 340/463 |
| 2010/0061591 A1 | 3/2010 | Okada et al. |
| 2010/0100325 A1* | 4/2010 | Lovell et al. ................. 701/301 |
| 2010/0215254 A1 | 8/2010 | Prokhorov |
| 2011/0093149 A1 | 4/2011 | Tanaka |
| 2011/0184617 A1 | 7/2011 | Hegemann et al. |
| 2011/0295467 A1* | 12/2011 | Browne et al. ................. 701/46 |

FOREIGN PATENT DOCUMENTS

| | | |
|---|---|---|
| JP | 2007155528 | 6/2007 |
| KR | 102010068062 | 6/2010 |
| KR | 1020120063657 | 6/2012 |

OTHER PUBLICATIONS

Combined Search and Examination Report dated Dec. 31, 2012 for Application No. GB 1216591.6.

Rattenbury, T., et al., "Methods for Extracting Place Semantics from Flickr Tags," ACM Transactions on the Web, Jan. 2009, pp. 1-30, vol. 3, No. 1, Article 1.

Kennedy, L., et al., "How Flickr Helps us Make Sense of the World: Context and Content in Community-Contributed Media Collections," MM, Sep. 23-28, 2007, pp. 1-10.

Amlacher, K., et al., "Geo-Contextual Priors for Attentive Urban Object Recognition," IEEE International Conference on Robotics and Automation, May 12-17, 2009, pp. 1-6.

Chen, X., et al., "Next Generation Map Making: Geo-Referenced Ground-Level LIDAR Point Clouds for Automatic Retro-Reflective Road Feature Extraction," 17th ACM SIGSPATIAL International Conference on Advances in Geographic Information Systems, Nov. 4-6, 2009, pp. 1-7.

Chen, X., et al., "Towards Next-Generation Map Making," NAVTEQ Corporation, Jun. 28-Jul. 3, 2009, pp. 1676-1683.

Fua, P., et al., "Object-Centered Surface Reconstruction: Combining Multi-Image Stereo and Shading," International Journal of Computer Vision, Sep. 1995, pp. 1-37, vol. 16, Issue 1.

Nishiyama, M., et al., "Illumination Normalization using Quotient Image-based Techniques," Recent Advances in Face Recognition, Dec. 2008, pp. 1-13.

Kim, S., et al., "An Advanced Approach for Navigation and Image Sensor Integration for Land Vehicle Navigation," Vehicular Technology Conference, Sep. 26-29, 2004, pp. 1-4.

Gehrig, S., et al., "System Architecture for an Intersection Assistant Fusing Image, Map, and GPS information," IEEE Intelligent Vehicles Symposium, Jun. 9-11, 2003, pp. 144-149.

\* cited by examiner

OPTIMIZING THE DETECTION OF OBJECTS IN IMAGES

FIELD OF THE INVENTION

The present invention generally relates to the detection of objects in digital images, and more particularly relates to optimizing the detection of objects in digital images using camera sensors deployed in a human assistive environment.

BACKGROUND OF THE INVENTION

Digital image based object detection, especially with respect to traffic sign recognition (TSR), has seen increased attention over the past few years. For example, object detection systems are currently being implemented in advanced driver assistance systems (ADAS). Conventional object detection methods usually involve two stages. First, in the detection stage, image regions that contain candidates of target objects are detected or localized. Then, in the recognition stage, such regions are further analyzed to recognize the specific content. However, these conventional object detection systems and methods generally require a large amount of computing resources, have slow detection speeds, and can be inaccurate.

SUMMARY OF THE INVENTION

In one embodiment, a method for detecting objects in a digital image is disclosed. The method comprises receiving at least positional data associated with a vehicle is received. Geographical information associated with the positional data is received. A probability of detecting a target object within a corresponding geographic area associated with the vehicle is determined based on the geographical data. The probability is compared to a given threshold. An object detection process is at least one of activated and maintained in an activated state in response to an object detection process in response to the probability being one of above and equal to the given threshold. The object detection process detects target objects within at least one image representing at least one frame of a video sequence of an external environment. The object detection process is one of deactivated and maintained in a deactivated state in response to the probability being below the given threshold.

In another embodiment, another method for detecting objects in a digital image is disclosed. The method comprises receiving at least one image representing at least one frame of a video sequence of an external environment of a vehicle. A set of environmental conditions associated with a geographic area corresponding to a location of the vehicle is identified. An illumination model is selected based on the set of environmental factors. The at least one image is processed with respect to the illumination mode.

In yet another embodiment, an information processing system for detecting objects in a digital image is disclosed. The information processing system comprises a memory and a processor that is communicatively coupled to the memory. The information processing system also comprises an object detection system that is communicatively coupled to the memory and the processor. The object detection system is configured to perform a method. The method comprises receiving at least positional data associated with a vehicle is received. Geographical information associated with the positional data is received. A probability of detecting a target object within a corresponding geographic area associated with the vehicle is determined based on the geographical data. The probability is compared to a given threshold. An object detection process is at least one of activated and maintained in an activated state in response to an object detection process in response to the probability being one of above and equal to the given threshold. The object detection process detects target objects within at least one image representing at least one frame of a video sequence of an external environment. The object detection process is one of deactivated and maintained in a deactivated state in response to the probability being below the given threshold.

In a further embodiment, a computer program product for detecting objects in a digital image is disclosed. The computer program product comprises a storage medium readable by a processing circuit and storing instructions for execution by the processing circuit for performing a method. The method comprises receiving at least positional data associated with a vehicle is received. Geographical information associated with the positional data is received. A probability of detecting a target object within a corresponding geographic area associated with the vehicle is determined based on the geographical data. The probability is compared to a given threshold. An object detection process is at least one of activated and maintained in an activated state in response to an object detection process in response to the probability being one of above and equal to the given threshold. The object detection process detects target objects within at least one image representing at least one frame of a video sequence of an external environment. The object detection process is one of deactivated and maintained in a deactivated state in response to the probability being below the given threshold.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting; but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Operating Environment

Figure 1:
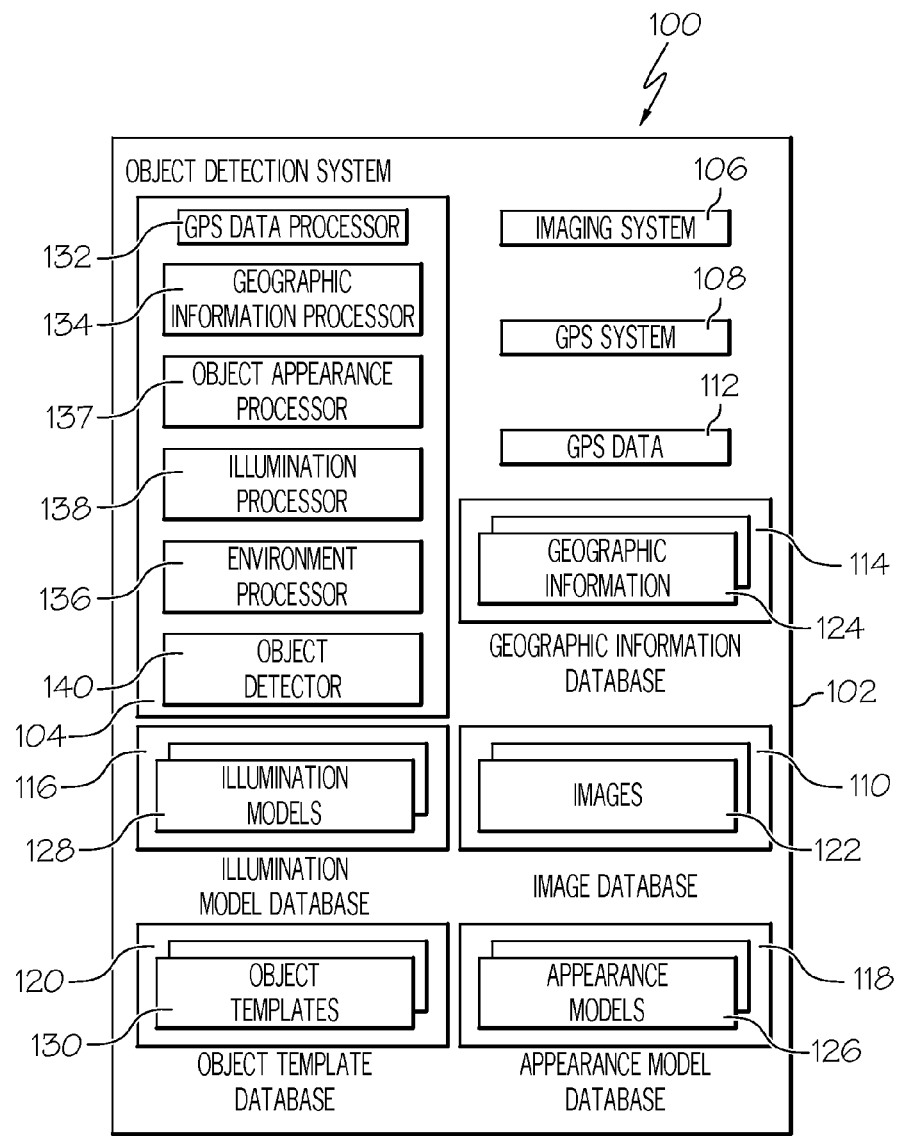
FIG. 1 is a block diagram illustrating a high level overview of a system for detecting objects in digital images according to one embodiment of the present invention.

According to one embodiment, FIG. 1 illustrates a general overview of one operating environment 100 for detecting objects in one or more frames/images. In particular, FIG. 1 shows an information processing system 102 that can be implemented within a vehicle such as an automobile, motorcycle, watercraft, and the like. Additionally, the system 102 can be communicatively coupled to a user assisted training environment for training purposes. The system 102 includes, among other things, an object detection system (ODS) 104, one or more imaging systems 106, and one or more global positioning systems (GPS) 108. The system 102 also comprises an image database 110, GPS data 112, a geographic information database 114, an illumination model database 116, an appearance model database 118, and an object template database 120.

The image database 110 comprises one or more frames/images 122. The frames/images 122, in one embodiment, represent frames of a video sequence (or still photo sequence) of an external environment captured by one or more imaging devices (e.g., cameras) of the imaging system 106. Two or more of these imaging devices can have overlapping field of views. The geographic information database 114 comprises geographic information 124 such as, but not limited to, maps and mapping information, points-of-interests and associated information (e.g., addresses, phone numbers, etc.), and any other information that can be utilized in a mapping or navigational environment.

The appearance model database 118 comprises appearance models 126 for various environmental factors such as, but not limited to, weather conditions (e.g., sunny, cloudy, overcast, raining, snowing, snow cover, etc.), seasons (e.g., winter, spring, summer, fall), time of day (e.g., morning, afternoon, dusk, night), and the like. These appearance models 126 model how a given object appears as a result of the above environmental factors. For example, an object can appear or be perceived differently between day time and night time. Objects can appear or be perceived differently based on the angle of view as well. The appearance models 126 allow the ODS 104 to account/compensate for this variability in appearance/perception.

The illumination model database 116 comprises illumination modes 128 such as illumination specific models, illumination invariant models, and synthesized illumination models that are utilized by the ODS 104 to compensate for current illumination conditions (e.g., lighting and reflection conditions) of the external environment. Each of these illumination model types are discussed in greater detail below. The object template database 120 comprises a plurality of object templates 130 that are utilized by the ODS 104 when detecting a target object within the frames/images 122. In one embodiment, the object database 120 comprises object templates for each type of object that is detectable by the ODS 104, such as (but not limited to) street signs, traffic signs, stop lights, road markings, addresses, business/building signs, billboards, buildings, businesses, headlights, road hazards, cars, pedestrians, animals, etc.

An object template 130 can be one or more actual images associated with a detectable object. For example, if one type of object detectable by the ODS 104 is a gas station sign, an object template 130 can be an actual image of a gas station sign for a given gas station of interest. A given gas station can be associated with multiple different gas station signs. Therefore, images of each of these different signs can be included in the object database 120 as a single object template or as separate object templates. Also, images of the detectable object at various angles, lighting conditions, and environmental conditions can also be stored as a template(s). This allows for a more robust detection process to be performed by the ODS 104. However, in another embodiment, a minimal number of images are used as object templates for each detectable object/object type. In this embodiment, the appearance models 126 and/or illumination models 128 can be applied to the object templates to account/compensate for various angles, lighting conditions, and environmental conditions under which an object may be captured by the imaging system 106. This allows the ODS 104 to maintain/retrieve fewer object templates 130 (and associated images), thereby saving storage space and processing resources while still providing a robust and accurate object detection process. In addition to (or in replacement of) images of a detectable object, an object template 130 can comprise information that has been extrapolated from an image of a given object of interest. This allows the information representing an image to be stored as compared to the image itself, thereby saving storage space.

It should be noted that each of the above databases and their components are discussed in greater detail below. It should also be noted that one or more of the geographic information database 114, the appearance model database 118, the illumination model database 116, and the object database 120 can reside on a remote system (not shown) that is communicatively coupled to the system 102 via one or more networks (not shown). The data from one or more of these databases can be transmitted to the system 102 as needed, thereby reducing the storage space required by the system 102.

The ODS 104, in one embodiment, comprises a GPS data processor 132, a geographical information processor 134, an environment processor 136, an object appearance processor 137, an illumination processor 138, and an object detector 140. It should be noted that one or more of these components can reside outside of the ODS 104. It should also be noted that the functions of one or more of these components can be combined into a single component as well. The GPS data processor 132 processes/analyzes the GPS data 112 provided by the GPS system 108. For example, the GPS data processor 132 can analyze the GPS 112 data to determine information such as (but not limited to), the current time, vehicle velocity, vehicle direction, location of the vehicle, vehicle elevation, etc. The geographical information processor 134 utilizes the GPS data 112 to identify geographic information 124 associated with the vehicle's current position/location and surrounding area. For example, based on location information within the GPS data 112 the geographical information processor 134 identifies a map within the geographic information database 114 that corresponds to the location information of the GPS data 112.

The environment processor 136 determines a current context of the environment in which the vehicle is travelling. For example, the environment processor 136 can determine the type of geographic area that the vehicle is located within such as a rural area or an urban area. The environment processor 136 can further determine a more granular context such as whether the current area is a wooded area, a mountainous area, a desert area, an industrial area, a downtown of a city, a suburb, etc. The ODS 104 uses this environmental/geographical context information to determine the probability that a target object is within the current area of the vehicle.

The environment processor 136 can also determine environmental factor/condition information such as current weather conditions (e.g., sunny, cloudy, overcast, raining, snowing, snow cover, foggy, etc.), seasons (e.g., winter, spring, summer fall), time of day (e.g., morning, afternoon, dusk, night). In one embodiment, time-of-day information can also include average lighting/illumination information associated with a given area for a given time of day such as morning, afternoon, dusk, and night. The environment processor 136 can determine these factors/conditions by analyzing the frames/images 122 being captured by the imaging system 106. Environmental factors/conditions can also be determined from weather information transmitted with the GPS data 112. The environment processor 136 can also retrieve/receive environmental factor/condition information from one or more remote systems. In another embodiment, a user can enter the environmental factor/condition information into the ODS 104. These types of environmental factors/conditions can be used by the ODS 104 to identify appropriate appearance models 126 and/or illumination models 128 for an object template 130 and/or the frames/images 122 captured by the imaging system 106 to optimize the object detector 104 with respect to the current environmental factors/conditions.

In yet another embodiment, substantially static environmental information such as season information (e.g., a calendar of seasons) and time of day information (e.g., time of sunrise, time of sunset, etc.) can be preloaded into the geographic information database 114 (or another database). Dynamic environmental information such as weather information, the current time, vehicle direct/velocity/elevation can be provided to the geographic information database 114 by one or more of the components in the system 102 such as the GPS data processor 132, and/or by one or more remote systems that are communicatively coupled to the system 102 via one or more networks (wired and/or wireless). This dynamic information can be received/retrieved by the system 102 at given intervals and/or on demand (e.g., when the environment processor 136, appearance processor 137, and/or illumination processor 138 requires the environment factor/condition for a given vehicle location).

The appearance processor 137 first identifies the right appearance models 126 based on the environment context information determined by the environment processor 136, and then applies such models to the right object templates 130, so as to generate appearance-adapted object templates. Such appearance-adapted object templates are later used to identify the objects-of-interest when processing the frames/images 122 captured by the imaging system 106. For example, the appearance processor 137 selects an appearance model 126 based on the time-of-day, season, weather conditions, etc., that has been detected by the environment processor 136 and automatically generates an adapted object template based on existing object template 130. This new object template is then used when processing a frame/image 122.

The illumination processor 138 first generates an illumination-adapted object template given an object template 130 (or an appearance-adapted object template if the appearance processor 137 is activated) by applying one of the following three illumination models: illumination specific model, illumination invariant model, and synthesized illumination model. The purpose of performing illumination adaptation, in one embodiment, is to match or normalize the object's current illumination condition with or against that of the object template 130. This illumination-adapted object template is later used to detect objects-of-interest when processing the frames/images 122 captured by the imaging system 106. This allows the ODS 104 to take into consideration various illumination conditions when performing the object detection process.

The ODS 104 further comprises one or more object detectors 140. The object detector 140 receives input from one or more of the various components of the system 102 discussed above. The object detector 140 utilizes the information received from these components to analyze the frames/images 122 for determining whether or not the frames/images 122 comprise a target object. In one embodiment, the object detector(s) 140 is a feature-based detector(s) and/or a machine-learning-based detector(s). However, other object detectors can be used as well. A detailed discussion on feature-based detectors and machine-learning-based detectors can be found in the commonly owned and co-pending U.S. application Ser. No. 13/085,985 entitled "Object Recognition Using HAAR Features and Histograms of Oriented Gradients", and the commonly owned and co-pending U.S. application Ser. No. 13/086,023 entitled "Detection of Objects in Digital Images", which are both hereby incorporated by reference in their entireties.

Objection Detection/Recognition within Digital Frames/Images

The ODS 104, in one embodiment, operates in real time to automatically detect various objects of a given desired object type/class from frames/images 122 captured by the imaging system(s) 106 utilizing GPS and geographical information. It should be noted that the various examples of target objects given throughout the following discussion are non-limiting. In other words, the ODS 104 is able to detect any type of object. For example, the ODS 104 can detect buildings, landmarks (and other structures), vehicles, headlights, pedestrians, animals, and/or the like.

In one embodiment, the ODS 104 performs a multi-stage (multi-mode) process. For example, in one stage the ODS 104 identifies the current environmental context of an immediate area, surrounding area, and/or future area corresponding to a vehicle's current location to determine whether or not a target object is likely to be detected within a given amount of time or distance. If a target object is likely to be detected the ODS 104 activates object detection components of the system 102. If a target object is not likely to be detected, the object detection components of the system 102 can be deactivated. This saves power and processing resources.

The following is a more detailed discussion with respect to the multi-stage (multi-mode) process of the ODS 104. This discussion is given with respect to the transactional flow of FIG. 2. The first operating mode of the ODS 104 operates to determine whether or not the detector 140 and its associated components should be activated or deactivated. As discussed above, the GPS system 108 receives GPS data 112. The GPS data processor 132 analyzes this data 112, at 202, to determine, for example, latitude and longitude coordinates of the vehicle, direction of travel, vehicle velocity, elevation, etc. This information is then passed to the geographical information processor 134. The geographical information processor 134 uses this information, at 204, to identify geographic information 124 such as a map associated with the current location of the vehicle, which is determined by the GPS data processor 132. The map can be a street map, a topographical map, a satellite map, a combination thereof, or the like. The information processor 134 can switch between each of these map types as needed.

The environment processor 136 analyzes, at 206, a corresponding map to determine an environmental context of the current area, future area, and/or surrounding area of the vehicle, at 208. For example, the environment processor 136 can determine if the vehicle is currently located within or will be travelling into a rural area, an urban area, etc. The environment processor 136 can further determine a more granular context such as whether the area is a wooded area, a mountainous area, an industrial area, a downtown of a city, a suburb, etc. In one embodiment, the environment processor 136 is able to determine this context based on detected features within the map such as forests, buildings, houses, etc. In another embodiment, a map is associated with metadata describing the various areas within the map. Based on this metadata the environment processor 136 can determine an environmental context associated therewith. The environment processor 136 can also zoom out to a larger view of the map. This allows the environment processor 136 to analyze a larger area of the map to identify upcoming environmental contexts. For example, an initial view of the map may show that the vehicle is currently travelling in a rural area, but a zoomed-out view shows that a city is a given distance away.

The environment processor 136 can further analyze the map to identify potential target objects or objects associated with target objects. For example, if the target object is a traffic sign, such as stop sign or a stop light, the environment processor 136 can analyze the map to determine if the current area or an upcoming area comprises any such target objects. The environment processor 136 can also determine if the map comprises items/features associated with a target object. For example, the environment processor 136 can analyze the map to determine if the map comprises an intersection, which is generally associated with a stop sign or stop light. The environment processor 136 is able to zoom into the map for a more granular/detailed view when trying to identify potential target objects. The environment processor 136 can also zoom-out to analyze a larger area.

Based on this determined environmental context the environment processor 136 can determine if a target object is likely to be found and either activate or deactivate the object detector 140 and associated components such as the imaging system 106. For example, if a target object is a specific coffee shop and the environment processor 136 has determined that the vehicle is currently traveling in rural area or that the area in the map failed to comprise any buildings, the environment processor 136 determines that the probability of a target object being in this area is below (or equal to) a given threshold and deactivates (or keeps deactivated) the object detector 140. However, if the current target object is a pedestrian and the environment processor 136 determines that the vehicle is entering a populated area then the environment processor 136 determines that the probability of a target object being in this area is above (or equal to) a given threshold and activates (or keep activated) the object detector 140.

Also, the environment processor 136 can use the current scale of the map and the vehicle's current speed to estimate a given time frame until the vehicle reaches an area that is likely to comprise a target object. In this embodiment, the environment processor 136 can set a timer (or adjust an existing timer based on vehicle speed) for automatically activating the object detector 140 and its associated components. The same can be performed with respect to estimating when the vehicle will reach an area where target objects are not likely to be detected. A timer can then be set (or updated) for automatically deactivating the object detector 140 and its associated components such as the imaging system 106, object appearance processor 137 and the illumination processor 138. It should be noted that the above operating mode of determining whether to activate/deactivate the object detector 140 and its associated components is optional. In other words, the object detector 140 and its associated components can always be active or active only when manually activated by a user.

Figure 2:
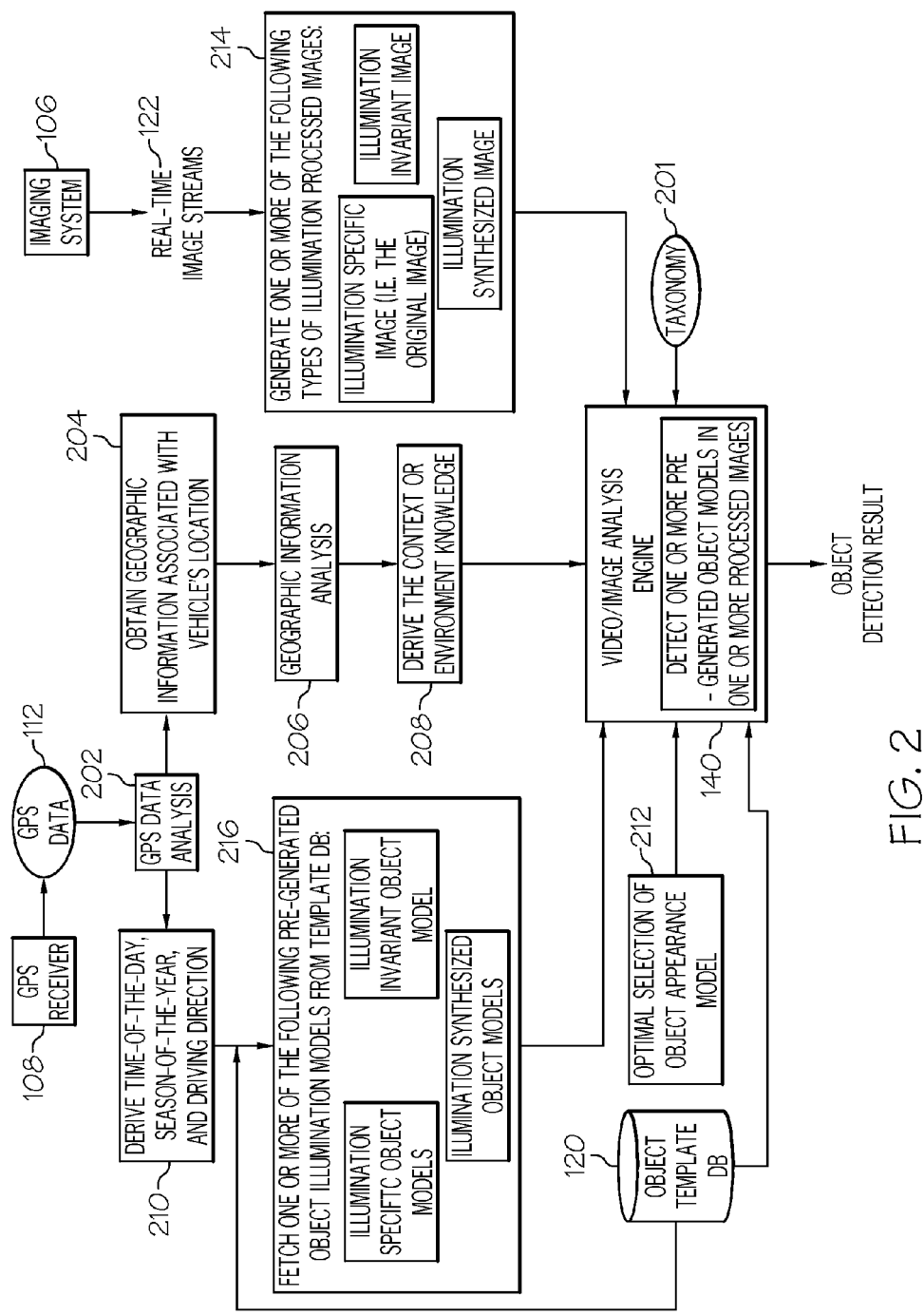
FIG. 2 is a transactional diagram illustrating a multi-stage operating mode of the system in FIG. 1 according to one embodiment of the present invention.

If the ODS 104 determines that the object detector 140 and its associated components should be activated (or remain activated), the ODS 104 then operates in a second operating mode for detecting target objects. Target objects and their classifications are represented in FIG. 2 by the "Taxonomy" element 201. It should be noted that in this mode the environmental context determined by the environment processor 136 can be passed to the object detector 140 or another component of the ODS 104. Alternatively, the environmental context information can be stored during the first operating modes and later retrieved by the ODS 104 while operating in the second mode.

When the object detector 140 is in an activated state, the environment processor 136 can identify environment factor/condition information such as weather conditions (e.g., sunny, cloudy, overcast, raining, snowing, snow cover, etc.), seasons (e.g., winter, spring, summer fall), time of day (e.g., morning, afternoon, dusk, night), and the like, as shown at 210 in FIG. 2. It should be noted that this environment factor/condition can also be identified as part of the first operating mode discussed above as well. The object appearance processor 137 analyzes the environment factor/condition information gathered by the environment processor 136. Based on this analysis the object appearance processor 137 selects an appearance model 126, applies it to the target objects in the object template DB 120, and generates appearance-adapted object templates. Such adapted object templates are used to detect objects-of-interests in the frames/images 122 captured by the imaging system 106, at 212. Alternatively, the appearance model 126 can be passed to the object detector 140 for performing an appearance normalization process on the frames/images 122 captured by the imaging system 106, so that the objects' appearances in the normalized frames/images match those of the objects in the object template DB 120. As discussed above, an object can appear (or be perceived) differently within the frames/images 122 based upon the angle at which the object is viewed, the weather conditions, the current season, the time of day, illumination conditions, etc. Therefore, the appearance model 126 is used by the ODS 104 to normalize a captured frame/image 122 based on the current environment factors/conditions. This increases the accuracy of the object detector 140.

In addition, the illumination processor 138 determines an illumination context associated with the area and/or surrounding area in which the vehicle is currently located and optionally a future area in which the vehicle may travel. It should be noted that the illumination context can be determined during the first mode/stage of operation discussed above. Also, the illumination context can be determined by either of the environment processor 136 and/or the illumination processor 138. If the illumination processor 138 determines/obtains this information, the illumination processor 138 can perform the same process as described above with respect to the environment processor 136.

In one embodiment, the illumination context is determined based on illumination conditions such as lighting and reflectance conditions determined by the environment processor. These lighting and reflectance conditions can vary based on vehicle direction/velocity/elevation, weather conditions, season information, time of day information, and the like. This results in the illumination/reflective characteristics of an object within a frame/image to vary depending on environmental factors. For example, a traffic sign may appear different in an image depending on whether there is snow on the ground reflecting sun light onto the sign or whether there is cloud cover.

The illumination context is used by the illumination processor 138 to select one or more illumination models 128 for optimizing the object detector 140 with respect to the current illumination conditions that have been detected.

The illumination processor 138 selects one or more illumination models 128 based on the determined illumination context. The frames/images 122, at 214, and/or the object templates 130, at 216, are then processed based on the selected illumination model(s) 128. Alternatively, the selected illumination model(s) 128 can be passed to the object detector 140 to optimize the detection process with respect to the illumination context that has been determined.

One type of illumination model that can be selected is an illumination specific model. An illumination specific model is a model that has been trained for a target object with respect to a specific illumination condition such as, dawn, daytime, dusk, night time, etc. For example, a target object such as a stop sign can be associated with an illumination specific models that have been trained with respect to the stop sign in early morning lighting conditions, daytime lighting conditions, twilight lighting conditions, and night time lighting conditions. Therefore, if the current illumination context indicates that the current lighting conditions correspond to twilight lighting conditions the illumination processor 138 can select a twilight illumination model. This illumination model can then be used by the ODS 104 to adjust/optimize the object detector 140 for twilight lighting conditions. Therefore, not only is the object detector 140 optimized for specific lighting conditions, the object detector is optimized for detecting a given target object in those specific lighting conditions.

Another type of illumination model is an illumination invariant model. This model type allows for the object detector 140 to be adjusted/optimized for various illumination conditions without having to maintain multiple illumination specific models for each detectable object. In this embodiment, the illumination processor 138 utilizes an illumination invariant model to normalize frames/images 122 captured by two or more imaging devices with overlapping field of views. This normalization process allows the detector object 140 to perform an accurate detection process across varying illumination conditions. One advantage of the illumination invariant model is that multiple illumination specific models for an object of interest do not need to be generated and maintained, thereby saving processing and storage resources.

An illumination invariant model utilizes epipolar geometry to solve corresponding features/shapes within the images. See, for example, P. Fua, Y. G. Leclerc, "Object-Centered Surface Reconstruction: Combining Multi-Image Stereo and Shading", IJCV, 1995, which is hereby incorporated by reference in its entirety. With this model brightness of the corresponding points in the multiple camera views are related to provide constraints for assessing the illumination conditions and albedo of a target object. The illumination processor 138 also performs albedo and illumination assessment for applying illumination correction to the images to obtain illumination normalized images. By taking the albedo into account, the illumination processor 138 can improve object detection performance by confirming the existence of a target object within multiple camera views. When the illumination is normalized, the illumination processor 138 can apply the illumination invariant model to frames/images under varying lighting conditions. It should be noted that if multiple cameras are not available in the imaging system 106, quotient-image based techniques can be used to obtain a normalized model of the target objects for more accurate matching. See, for example, Nishiyama, T. Kozakaya and O. Yamaguchi, "Illumination normalization using quotient image-based techniques", Recent advances in face recognition, 2008, which is hereby incorporated by reference in its entirety.

The illumination processor 138 can also select/create a synthesized illumination model. A synthesized illumination model is created from at least one illumination specific model (e.g., a daytime illumination model) and an illumination invariant model. In other words, additional illumination specific models can be generated from a single illumination specific model and an illumination invariant model. This allows for illumination specific models to be generated at any granularity level without the cost of collecting training data for each such illumination condition.

It should be noted that the ODS 104 is not required to utilize both the appearance models 126 and the illumination models 128. For example, the ODS 104 can utilize only one of these model types 126, 128. Once frames/images 122 and/or the object templates 130 have been processed with respect to at least one appearance model 126 and/or at least one illumination model 128 (or once these models have been passed to the object detector 140), the object detector 140 analyzes the frames/images 122 to determine whether or not a target object exists within the frames/images 122. For example, in one embodiment, the object detector 140 compares the frames/images 122 to one or more corresponding processed object templates 130. If the features identified within the frames/images 122 substantially match the features of the processed object template(s) 130 the object detector 140 determines that a target object has been identified within the frames/images 122. The user can then be notified of the detected object or other actions can be performed. It should be noted that various object detection processes can be utilized by the object detector 140. One example of an object detection process is discussed in U.S. patent application entitled "Object Recognition Using HAAR Features and Histograms of Oriented Gradients", U.S. application Ser. No. 13/085,985. Another example of an object detection process is discussed in the U.S. patent application entitled "Detection of Objects in Digital Images", U.S. application Ser. No. 13/086,023.

Operational Flow Diagram

Figure 3:
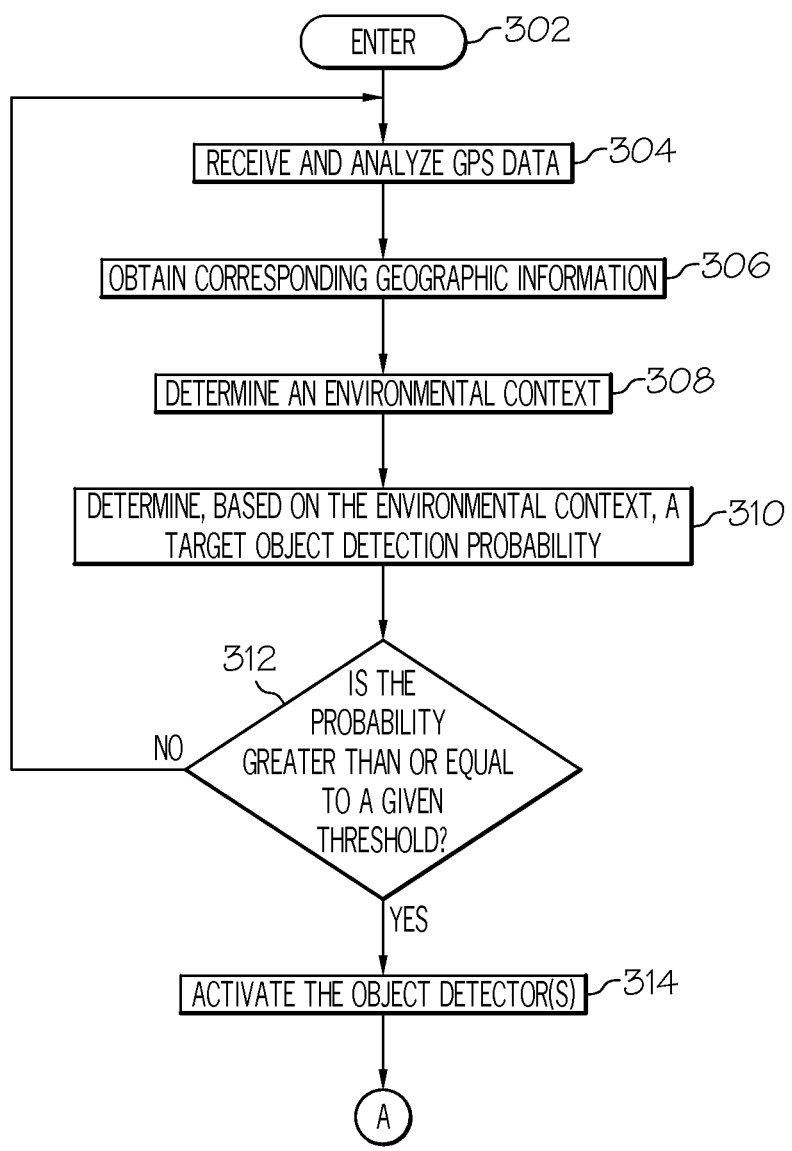
FIG. 3 is an operational flow diagram illustrating one example of a process for activating/deactivating one or more components of the system in FIG. 1 according to one embodiment of the present invention.

FIG. 3 is an operational flow diagram illustrating one example of operating an object detection system in a first operating mode for activating or deactivating components of the object detection system. It should be noted that a more detailed discussion of this process was given above with respect to FIGS. 1 and 2. The operational flow diagram begins at step 302 and flows to step 304. The ODS 104, at step 304, receives and analyzes GPS data 112. The ODS 104, at step 306, obtains geographic information 124 such as, but not limited to, a map from a geographic information database 114.

The ODS 104, at step 308, analyzes the geographic information to determine an environmental context associated with at least one of a current area, a surrounding area, and a future area in which the vehicle is currently traveling and/or will travel in the future. For example, the ODS 104 can determine if the vehicle is located within a rural area or an urban area. The ODS 104 can further determine a more granular context such as whether the current area is a wooded area, a mountainous area, an industrial area, a downtown of a city, a suburb, etc. As discussed above, the ODS 104 can also analyze the features of a map to determine if the current view of the map potentially comprises any target objects and/or features associated with a target object.

Based on this analysis, the ODS 104, at step 310, determines a probability of a target object being detected within the analyzed area of the map. The ODS 104, at step 312, then determines if this probability is one of above or equal to a given threshold. If the result of this determine is positive, the ODS 104, at step 314, activates the object detector 140 and any components required by the detector 140. The control then flows to entry point A of FIG. 4. If the result of this determination is negative, the control flow returns to step 304.

Figure 4:
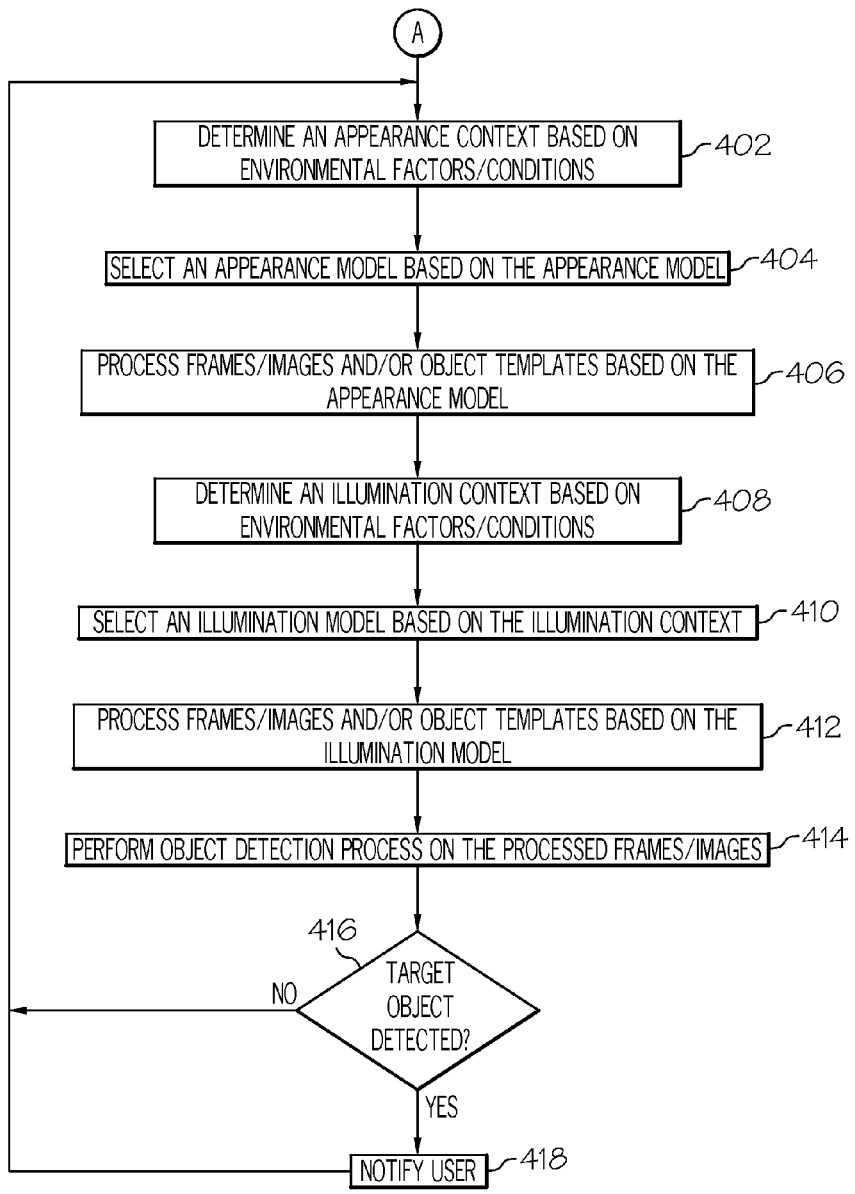
FIG. 4 is an operational flow diagram illustrating one process optimizing an object detection process performed by the system of FIG. 1 according to one embodiment of the present invention.

FIG. 4 is an operational flow diagram illustrating one example of operating an object detection system in a second operating mode in which an object detector and any required components are in an activated state. It should be noted that a more detailed discussion of this process was given above with respect to FIGS. 1 and 2. In this second operation mode the ODS 104, at step 402, determines an appearance context based on environmental factors/conditions such as, but not limited to, weather conditions (e.g., sunny, cloudy, overcast, raining, snowing, snow cover, etc.), seasons (e.g., winter, spring, summer fall), time of day (e.g., morning, afternoon, dusk, night), and the like. It should be noted that these environmental factors/conditions can also be determined by the ODS 104 during the first operating mode as well. These environmental factors/conditions can be identified from the GPS data 112, from information in the geographic information database 114, manually entered by a user, from frames/images 122 captured by the imaging system 106, and the like.

The ODS 104, at step 404, then selects one or more appearance models 126 based on the appearance context that has been determined. The ODS 104, at step 406, then processes the frames/images 122 captured by the imaging system 106 and/or object templates 130 associated with detectable objects based on the one or more appearance models 126. This processing either normalizes the appearance of objects within the frames/images 122, or applies the one or more appearance models to the target object templates 130 to generate one or more appearance-adapted object templates, and/or optimizes the object detector 140 with respect to the current environmental factors/conditions.

The ODS 104, at step 408, determines an illumination context based on the environmental factors/conditions as well. However, it should be noted that the system 104 is not required to determine both an appearance and illumination context. As discussed above, the illumination context identifies the various illumination conditions (e.g., lighting and reflectance) conditions of the environment in which the vehicle is traveling or will be travelling. The ODS 104, at step 410, then selects or generates one or more illumination models 128 based on the illumination context that has been determined. The ODS 104, at step 412, then processes the frames/images 122 captured by the imaging system 106 and/or object templates 130 associated with detectable objects based on the one or more illumination models 128. This processing either normalizes the illumination of objects within the frames/images 122 and generates illumination invariant frames/images, or generates illumination specific or illumination synthesized frames/images, and generates illumination specific or illumination invariant or illumination synthesized object templates, and/or optimizes the object detector 140 with respect to the illumination conditions of the environment.

The ODS 104, at step 414, performs an object detection process on the frames/images 122 that have been processed using the appearance and/or illumination models 126, 128.

The ODS 104, at step 416, determines if a target object has been detected. If the result of this determination is negative, the control flow returns to step 402. If the result of this determination is positive, the ODS 104, at step 418, notifies the user of the detected object and/or performs another action. The control flow then returns to step 402. It should be noted that the ODS 104 can operate in both of the first and second modes simultaneously. For example, when the ODS 104 is in the second operating mode, the ODS 104 can continue to analyze the geographic information 124 for determining whether or not the object detector 140 should be deactivated.

Information Processing System

Figure 5:
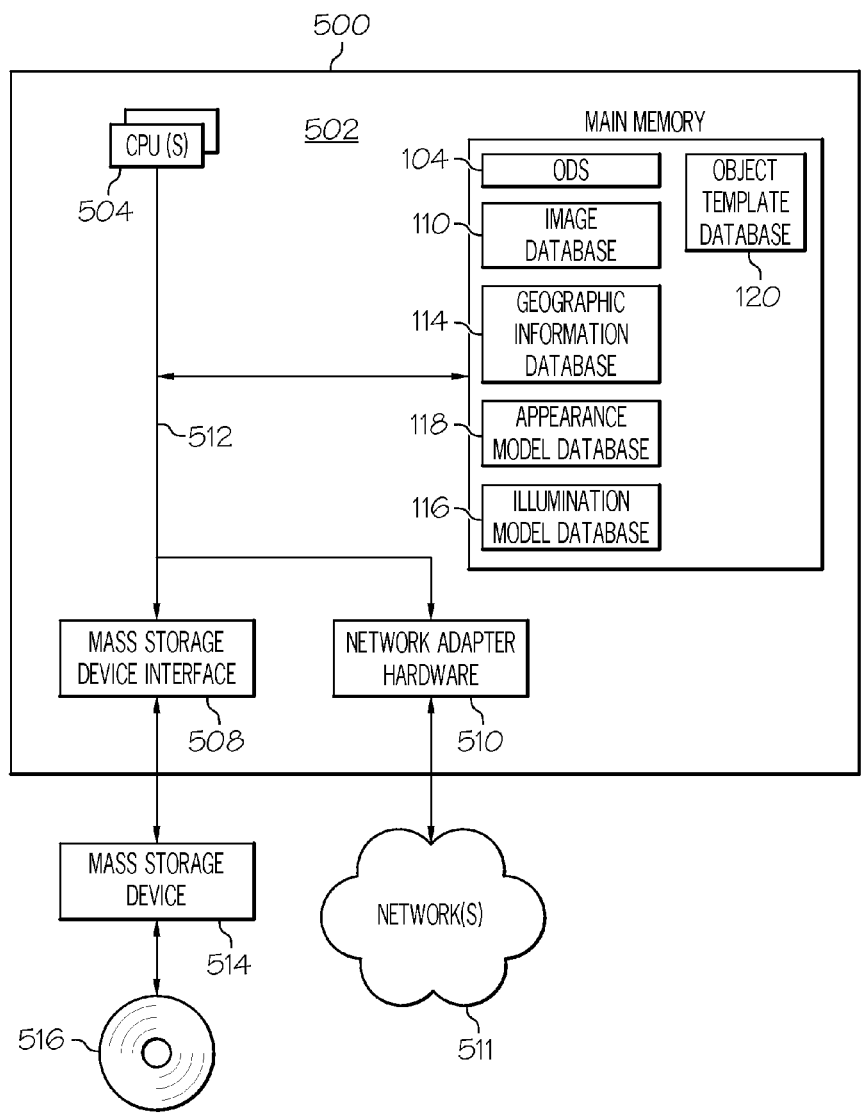
FIG. 5 is a block diagram illustrating a more detailed view of an information processing system according to one embodiment of the present invention.

FIG. 5 is a block diagram illustrating an information processing system that can be utilized in embodiments of the present invention. The information processing system 500 is based upon a suitably configured processing system adapted to implement one or more embodiments of the present invention (e.g., the system 102 of FIG. 1). Any suitably configured processing system can be used as the information processing system 500 in embodiments of the present invention.

The information processing system 500 includes a computer 502. The computer 502 has a processor(s) 504 that is connected to a main memory 506, mass storage interface 508, network adapter hardware 510, imaging system 106, and GPS system 108. A system bus 512 interconnects these system components. Although only one CPU 504 is illustrated for computer 502, computer systems with multiple CPUs can be used equally effectively. The main memory 506, in this embodiment, comprises the object detection system 104 and its components, the image database 110 and its contents, the geographic information database 114, the illumination model database 116 and its contents, the appearance model database 118 and its contents, and the object template database 120 and its contents.

The mass storage interface 508 is used to connect mass storage devices, such as mass storage device 514, to the information processing system 500. One specific type of data storage device is an optical drive such as a CD/DVD drive, which can be used to store data to and read data from a computer readable medium or storage product such as (but not limited to) a CD/DVD 516. Another type of data storage device is a data storage device configured to support, for example, NTFS type file system operations.

An operating system included in the main memory is a suitable multitasking operating system such as any of the Linux, UNIX, Windows, and Windows Server based operating systems. Embodiments of the present invention are also able to use any other suitable operating system. Some embodiments of the present invention utilize architectures, such as an object oriented framework mechanism, that allows instructions of the components of operating system to be executed on any processor located within the information processing system 500. The network adapter hardware 510 is used to provide an interface to a network 511. Embodiments of the present invention are able to be adapted to work with any data communications connections including present day analog and/or digital techniques or via a future networking mechanism.

Although the exemplary embodiments of the present invention are described in the context of a fully functional computer system, those of ordinary skill in the art will appreciate that various embodiments are capable of being distributed as a program product via CD or DVD, CD-ROM, or other form of recordable media, or via any type of electronic transmission mechanism. Also, aspects of the present invention may take the form of an entirely hardware embodiment, an entirely software embodiment (including firmware, resident software, micro-code, etc.), or an embodiment combining software and hardware aspects that may all generally be referred to herein as a "circuit" "module" or "system".

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. A computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (e.g., through the Internet using an Internet Service Provider).

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method, with an information processing system, for detecting objects in a digital image, the method comprising:
   receiving at least one image representing at least one frame of a video sequence of an external environment of a vehicle;
   identifying a set of environmental conditions associated with a geographic area corresponding to a location of the vehicle;
   selecting an illumination model based on the set of environmental conditions;
   processing the at least one image with respect to the illumination mode;
   retrieving at least one object template associated with an object of interest;
   selecting an object appearance model based on the set of environmental conditions;
   processing the at least one object template with respect to the illumination model and object appearance model;
   analyzing the at least one image that has been processed with respect to the at least one object template that has been processed; and
   determining, based on the analyzing, if the at least one image that has been processed comprises the object of interest.

2. The method of claim 1, wherein the processing comprises at least one of:
   normalizing a set of illumination characteristics of objects within the at least one image;
   generating an illumination invariant image from the at least one image;
   generating an illumination specific image from the at least one image; and
   generating an illumination synthesized image from the at least one image.

3. The method of claim 1, wherein processing the at least one object template comprises at least one of:
   normalizing a set of illumination characteristics of the at least one object template;
   generating an illumination invariant object template;
   generating an illumination specific object template from the at least one object template;
   generating an illumination synthesized object template from the at least one object template; and
   generating an appearance-adapted object template.

4. The method of claim 1, wherein the set of environmental conditions comprises at least one of:
   a weather condition associated with the corresponding geographic area;
   a time-of-day associated with the corresponding geographic area;
   a current season associated with the corresponding geographic area; and
   a lighting condition associated with the corresponding geographic area.

5. The method of claim 1, wherein the illumination model is one of an illumination invariant model, an illumination specific model, and a synthesized illumination model that is based on at least one other illumination model associated with a different set of environmental conditions.

6. An information processing system for detecting objects in a digital image, the information processing system comprising:
   a memory;
   a processor communicatively coupled to the memory; and
   an object detection system communicatively coupled to the memory and the processor, the object detection system configured to perform a method comprising:
      receiving at least one image representing at least one frame of a video sequence of an external environment of a vehicle;

identifying a set of environmental conditions associated with a geographic area corresponding to a location of the vehicle;

selecting an illumination model based on the set of environmental conditions;

processing the at least one image with respect to the illumination mode;

retrieving at least one object template associated with an object of interest;

selecting an object appearance model based on the set of environmental conditions;

processing the at least one object template with respect to the illumination model and object appearance model;

analyzing the at least one image that has been processed with respect to the at least one object template that has been processed; and determining, based on the analyzing, if the at least one image that has been processed comprises the object of interest.

7. The information processing system of claim 6, wherein the method comprises:

normalizing a set of illumination characteristics of objects within the at least one image;

generating an illumination invariant image from the at least one image; generating an illumination specific image from the at least one image; and generating an illumination synthesized image from the at least one image.

8. The information processing system of claim 6, wherein processing the at least one object template comprises at least one of:

normalizing a set of illumination characteristics of the at least one object template;

generating an illumination invariant object template;

generating an illumination specific object template from the at least one object template;

generating an illumination synthesized object template from the at least one object template; and generating an appearance-adapted object template.

9. The information processing system of claim 6, wherein the set of environmental conditions comprises at least one of:

a weather condition associated with the corresponding geographic area;

a time-of-day associated with the corresponding geographic area;

a current season associated with the corresponding geographic area; and a lighting condition associated with the corresponding geographic area.

10. The information processing system of claim 6, wherein the illumination model is one of an illumination invariant model, an illumination specific model, and a synthesized illumination model that is based on at least one other illumination model associated with a different set of environmental conditions.

11. A computer program product for detecting objects in a digital image, the computer program product comprising:

a non-transitory storage medium readable by a processing circuit and storing instructions for execution by the processing circuit for performing a method comprising:

receiving at least one image representing at least one frame of a video sequence of an external environment of a vehicle;

identifying a set of environmental conditions associated with a geographic area corresponding to a location of the vehicle;

selecting an illumination model based on the set of environmental conditions;

processing the at least one image with respect to the illumination mode;

retrieving at least one object template associated with an object of interest;

selecting an object appearance model based on the set of environmental conditions;

processing the at least one object template with respect to the illumination model and object appearance model;

analyzing the at least one image that has been processed with respect to the at least one object template that has been processed; and determining, based on the analyzing, if the at least one image that has been processed comprises the object of interest.

12. The computer program product of claim 11, wherein the method comprises:

normalizing a set of illumination characteristics of objects within the at least one image;

generating an illumination invariant image from the at least one image; generating an illumination specific image from the at least one image; and generating an illumination synthesized image from the at least one image.

13. The computer program product of claim 11, wherein processing the at least one object template comprises at least one of:

normalizing a set of illumination characteristics of the at least one object template;

generating an illumination invariant object template;

generating an illumination specific object template from the at least one object template;

generating an illumination synthesized object template from the at least one object template; and generating an appearance-adapted object template.

14. The computer program product of claim 11, wherein the set of environmental conditions comprises at least one of:

a weather condition associated with the corresponding geographic area;

a time-of-day associated with the corresponding geographic area;

a current season associated with the corresponding geographic area; and a lighting condition associated with the corresponding geographic area.

15. The computer program product of claim 11, wherein the illumination model is one of an illumination invariant model, an illumination specific model, and a synthesized illumination model that is based on at least one other illumination model associated with a different set of environmental conditions.

* * * * *